(12) United States Patent
Ripy et al.

(10) Patent No.: US 7,437,495 B2
(45) Date of Patent: *Oct. 14, 2008

(54) METHOD AND APPARATUS FOR ASSIGNING BUS GRANT REQUESTS

(75) Inventors: Paul B. Ripy, Guerneville, CA (US); Keith Q. Chung, Durham, NC (US); Gary J. Geerdes, Santa Rosa, CA (US); Christophe P. Leroy, Rohnert Park, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 11/414,687

(22) Filed: Apr. 27, 2006

(65) Prior Publication Data

US 2006/0195641 A1    Aug. 31, 2006

Related U.S. Application Data

(63) Continuation of application No. 10/669,192, filed on Sep. 23, 2003, now Pat. No. 7,065,594.

(51) Int. Cl.
G06F 13/36    (2006.01)
(52) U.S. Cl. ........................ 710/117; 710/240
(58) Field of Classification Search ................. 710/107, 710/110, 111, 113–117, 240, 241
See application file for complete search history.

(56) References Cited

U.S. PATENT DOCUMENTS

| | | | |
|---|---|---|---|
| 3,851,104 A | 11/1974 | Willard et al. | |
| 4,586,175 A | 4/1986 | Bedard et al. | |
| 4,763,320 A | 8/1988 | Rudolph et al. | |
| 4,814,974 A | 3/1989 | Narayanan et al. | |
| 4,891,805 A | 1/1990 | Fallin | |
| 4,928,273 A | 5/1990 | Protopapas | |
| 4,969,120 A * | 11/1990 | Azevedo et al. .............. | 710/117 |
| 5,481,680 A | 1/1996 | Larson et al. | |
| 5,867,670 A | 2/1999 | Kim et al. | |
| 6,034,960 A | 3/2000 | Beshai et al. | |
| 6,035,361 A | 3/2000 | Kim et al. | |
| 6,058,450 A * | 5/2000 | LaBerge ..................... | 710/107 |
| 6,119,214 A | 9/2000 | Dirks | |

(Continued)

FOREIGN PATENT DOCUMENTS

WO    WO 99/55036    10/1999

OTHER PUBLICATIONS

"Real-Time Self-Granting Centrally Directed Distributed Arbitration With Fairness", Mar. 1, 1995, IBM Technical Disclosure Bullentin, vol. 38, Issue 3, pp. 421-424.

*Primary Examiner*—Khanh Dang
(74) *Attorney, Agent, or Firm*—Mark C. Pickering

(57) ABSTRACT

Access to a bus is granted to one of a number of requesting communication circuits that each submitted a bus control request during a request period of an arbitration period in response to the entries in a priority table. If a requesting communication circuit has an identity and priority that match the identity and priority of a communication circuit stored in a row of the priority table that corresponds with the arbitration period, access to the bus is granted to the requesting communication circuit.

20 Claims, 6 Drawing Sheets

U.S. PATENT DOCUMENTS

| | | |
|---|---|---|
| 6,185,647 B1 | 2/2001 | Shibuya |
| 6,286,083 B1 | 9/2001 | Chin et al. |
| 6,311,244 B1 | 10/2001 | Sheafor et al. |
| 6,512,769 B1 | 1/2003 | Chui et al. |
| 6,636,915 B1 | 10/2003 | Dabby et al. |
| 6,718,422 B1 | 4/2004 | Kelley et al. |
| 6,768,745 B1 | 7/2004 | Gorshe et al. |
| 6,907,491 B2 | 6/2005 | Moss |
| 6,910,088 B2 * | 6/2005 | LaBerge ................. 710/117 |
| 2002/0112106 A1 | 8/2002 | Henehan et al. |
| 2003/0115369 A1 | 6/2003 | Walter et al. |
| 2004/0064615 A1 | 4/2004 | Hammitt et al. |
| 2004/0081145 A1 | 4/2004 | Harrekilde-Petersen et al. |
| 2004/0267991 A1 | 12/2004 | Delaney |
| 2005/0066092 A1 | 3/2005 | Ripy et al. |

\* cited by examiner

METHOD AND APPARATUS FOR ASSIGNING BUS GRANT REQUESTS

This is a continuation application of application Ser. No. 10/669,192 filed on Sep. 23, 2003, now U.S. Pat. No. 7,065,594, issued on Jun. 20, 2006.

BACKGROUND OF THE INVENTION

1. Field of the Invention

The present invention relates to a method and apparatus of allocating bandwidth on a bus-based communication system and, more particularly, to a method and apparatus of allocating minimum and maximum bandwidths on a bus-based communication system.

2. Description of the Related Art

A bus-based communication system is a system that allows a number of communication circuits to exchange signals with each other over a group of shared electrical pathways. For example, the communication circuits on service cards, such as xDSL and other line cards, can be connected to, and communicate over, a bus.

FIG. 1 shows a block diagram that illustrates a conventional bus-based communications system 100. As shown in FIG. 1, system 100 includes a cell bus 110 that has a first bus BUS-A and a pair of first-bus control lines SEL-A0 and SEL-A1. In addition, cell bus 110 also includes a second bus BUS-B, and a pair of second-bus control lines SEL-B0 and SEL-B1. First bus BUS-A utilizes a first group of electrical pathways, such as eight electrical pathways that represent eight bits, while second bus BUS-B utilizes a second group of electrical pathways, such as eight electrical pathways that represent eight bits.

As further shown in the FIG. 1 example, system 100 also includes a number of service cards 112 that are connected to cell bus 110. Each service card 112 is also connected to a number of network devices 114 to receive a number of streams of data cells DS. The data cells DS can have different priority levels such that a data cell DS from one network device 114 is preferred over the data cell DS from another network device 114.

Each service card 112 includes a communication circuit 116 that has a transmit circuit 120 that transmits data cells onto cell bus 110, and a receive circuit 122 that receives data cells from cell bus 110. Communication circuit 116 also includes a logic block 124 that processes the data cells DS.

In operation, when a number of communication circuits 116 are connected to cell bus 110, one of the communication circuits 116 assumes the role of bus master, while the remaining communication circuits 116 assume the roles of bus slaves and communicate over the bus as allowed by the bus master.

The bus master controls the timing of the bus along with access to the bus. For example, the bus master can define transmission periods on bus BUS-A and bus BUS-B, and determine the communication circuit 116 that has permission to use each of the transmission periods on the buses.

FIG. 2 shows a state diagram that illustrates a prior art state machine 200 operating as a bus master. State machine 200 is executed by the logic block 124 of the communication circuit 116 that is the bus master. As shown in FIG. 2, state machine 200 begins at state 210 by determining whether any requests to use bus BUS-B were received during a first request period.

Requests to use bus BUS-B are received during request periods where each communication circuit 116 that wishes to transmit a data cell over bus 110 outputs a request. The requests are output over select lines SEL-A0, SEL-A1, SEL-B0, and SEL-B1 to the bus master. Each request period can be, for example, 12 clock cycles long to support 24 communication circuits 116.

For example, a $1^{st}$ communication circuit can request bus BUS-B during a first-request clock cycle of a request period on select line SEL-A0 and SEL-A1, while a 13th communication circuit can request bus BUS-B during the first-request clock cycle on select lines SEL-B0 and SEL-B1. In addition, a $2^{nd}$ communication circuit can request bus BUS-B during a second-request clock cycle on select line SEL-A0 and SEL-A1, while a 14th communication circuit can request bus BUS-B during the second-request clock cycle on select lines SEL-B0 and SEL-B1. Thus, in this example, after 12 clock cycles, each of 24 communications circuits has had a one clock cycle opportunity to request control of bus BUS-B over select lines SEL-A0, SEL-A1, SEL-B0, and SEL-B1.

Each communication circuit 116 outputs a logic value onto the select lines SEL during its assigned clock cycle to indicate whether a request is being made and, if so, the priority level of the request. For example, a logic value of 0-0 can represent a high priority level, while a logic value of 0-1 can represent a medium priority level. In addition, a logic value of 1-0 can represent a low priority level, while a logic value of 1-1 can represent no request.

When requests are received during the first request period, state machine 200 moves to state 212 to define a group of requesting circuits that include the communication circuits 116 that submitted a bus control request during the first request period. For example, state machine 200 can define a group that includes only the communication circuits 116 that requested control of bus BUS-B during the first request period.

Following this, state machine 200 moves to state 214 to grant access to one of the group of requesting communication circuits to transmit in the next transmission period on bus BUS-B. Access is granted by outputting a grant to the requesting communication circuit 116 over the control lines SEL-B0 and SEL-B1. States 212 and 214 can be, for example, eight clock periods long. In addition, an error correction code can be transmitted at the same time on the select lines SEL-A0 and SEL-A1 that are not carrying the grant. Once the grant has been output, state machine 200 moves to state 216 to wait for a predefined period of time. The total time required to complete states 210-216 can be, for example, 26 clock cycles.

After the predefined time has expired, state machine 200 moves to state 218 to determine whether any requests to use bus BUS-A were received during a second request period. In the present example, one clock cycle before state machine 200 moves to state 218, the communication circuit 116 that received control over bus BUS-B, begins transmitting a data cell on bus BUS-B.

As with bus BUS-B, requests to use bus BUS-A are also received during a request period where each communication circuit 116 that wishes to transmit a data cell over bus 110 can output a request. The requests are again output over select lines SEL-A0, SEL-A1, SEL-B0, and SEL-B1 to the bus master, and the request period can also be 12 clock cycles long to support 24 communication circuits 116.

For example, a $1^{st}$ communication circuit can request bus BUS-A during a first-request clock cycle of a next request period on select lines SEL-B0 and SEL-B1, while a 13th communication circuit can request bus BUS-A during the first-request clock cycle on select lines SEL-A0 and SEL-A1. In addition, a $2^{nd}$ communication circuit can request bus BUS-A during the second-request clock cycle on select lines SEL-B 0 and SEL-B1, while a 14th communication circuit can request bus BUS-A during the second-request clock cycle on select lines SEL-A0 and SEL-A1. Thus, in this example, 12 clock cycles after the request period for bus BUS-A began, each of 24 communications circuits has had a one clock cycle opportunity to request control of bus BUS-A over select lines SEL-A0, SEL-A1, SEL-B0, and SEL-B1.

When requests for bus BUS-A are received during the second request period, state machine 200 moves to state 220 to define a group of requesting circuits that include the communication circuits 116 that submitted a bus control request during the second request period. For example, state machine 200 can define a group that includes only the communication circuits 116 that requested control of bus BUS-A during the second request period.

Following this, state machine 200 moves to state 222 to grant access to one of the group of requesting communication circuits to transmit a data cell in the next transmission period on bus BUS-A. As above, access is granted by outputting a grant to the requesting communication circuit 116 over the control lines SEL-A0 and SEL-A1. States 220 and 222 can be, for example, eight clock periods long. In addition, an error correction code can be transmitted at the same time on the select lines SEL-B0 and SEL-B1 that are not carrying the grant.

Once the grant has been output, state machine 200 moves to state 224 to wait for a predefined period of time. The total time required to complete states 218-224 can be, for example, 26 clock cycles. After the predefined time has expired, state machine 200 returns to state 210 to repeat the process. In addition, if no requests are received during the first request period, state machine 200 waits until the end of the 26 clock cycle, and then moves from state 210 to state 218. Similarly, if no requests are received during the second request period, state machine 200 waits until the end of the 26 clock cycle, and then moves from state 218 to state 210.

Thus, state machine 200 moves through states 210-216, which define a first arbitration period, to determine and grant permission to transmit a data cell during the next transmission period on bus BUS-B, and then through states 218-224, which define a second arbitration period, to determine and grant permission to transmit a data cell during the next transmission period on bus BUS-A. As a result, state machine 200 provides an alternating series of arbitration periods where control over bus BUS-B is determined, and then control over bus BUS-A is determined.

FIG. 3 shows a graphical representation that further illustrates prior art state machine 200. As shown in FIG. 3, state machine 200 defines an alternating series of BUS-B and BUS-A arbitration periods 310 and 312, respectively, on control lines SEL-A0, SEL-A1, SEL-B0, and SEL-B1. The BUS-B arbitration period 310 can be implemented with, for example, states 210-216, while the BUS-A arbitration period 312 can be implemented with, for example, states 218-224.

In the FIG. 3 example, following a BUS-B arbitration period 310, the communication circuit 116 that received the grant begins transmitting a data cell on bus BUS-B one clock cycle before the next BUS-A arbitration period 312, and continues transmitting the data cell for a transmit period. The transmit period can be, for example, 52 clock cycles long.

Similarly, following a BUS-A arbitration period 312, the communication circuit 116 that received the grant begins transmitting a data cell on bus BUS-A one clock cycle before the next BUS-B arbitration period 310, and continues transmitting the data cell for the transmit period.

Thus, as shown in FIG. 3, when a communication circuit 116 receives control over one of the two buses, such as BUS-A, the circuit 116 transmits the data cell over the bus during the next two arbitration periods. By utilizing two 26-cycle arbitration periods and one 52-cycle transmit period, a single 52 byte ATM cell can be transmitted.

FIG. 4 shows a flow chart that illustrates a prior art method 400 of granting access to a bus to one of a number of requesting communication circuits. In the present case, each of the requesting communication circuits submitted a bus control request to the bus master during the same request period.

As shown in FIG. 4, method 400, which can be used to implement steps 214 and 222, begins at step 410 by identifying the requesting communication circuits 116 that wish to transmit a high priority data cell. Priority can be divided into different levels, such as high, medium, and low, and assigned to different data cells DS so that a data cell DS with a high priority is preferred over a data cell DS with a medium or low priority, while a data cell DS with a medium priority is preferred over a data cell DS with a low priority.

If no communication circuits with a high priority data cell requested control, method 400 moves to step 412 to identify the requesting communication circuits 116 that wish to transmit a medium priority data cell. If no communication circuits with a medium priority data cell requested control, method 400 moves to step 414 to identify the requesting communication circuits that wish to transmit a low priority data cell.

Once the requesting communication circuits within a priority level have been identified, method 400 moves from either step 410, step 412, or step 414 to step 416 to determine which of the communication circuits within the priority level will receive the grant (permission to transmit during the next transmission period).

When several requesting communication circuits 116 have the same priority level, the requesting communication circuit 116 to receive the grant can be defined by an arbitration, such as a declining round robin. In a declining round robin, the requesting communication circuits 116 circulate within a hierarchical ranking.

The requesting communication circuit at the top of the ranking is assigned the grant and, after receiving the grant, moves to the bottom of the ranking. The ranking of a communication circuit 116 increases each time the circuit is denied a grant, i.e., control of the bus.

One drawback with method 400 is that if the requesting communication circuits 116 with high priority data streams are over subscribed, method 400 can always or nearly always move from step 410 to step 416. As a result, the higher priority data cells DS can consume all of the available bandwidth, thereby preventing the lower priority data cells DS from being transmitted onto the bus. Thus, there is a need for a method and apparatus that grants access to a bus that insures that lower priority data streams are able to transmit information across the bus.

SUMMARY OF THE INVENTION

A method of assigning bus grants is disclosed in accordance with an embodiment of the present invention. The method includes determining if one or more bus grant requests were received during a bus request period. Each bus grant request includes a number of device characteristics. Each bus request period has a corresponding number of stored characteristics. In addition, the method includes outputting a bus grant to a device that output a bus grant request during the bus request period when each device characteristic of the bus grant request matches a corresponding stored characteristic.

A communication device is also disclosed in accordance with an embodiment of the present invention. The communication device includes a memory to hold a number of stored characteristics for each of a plurality of bus request periods, and a logic device that is connected to the memory. The logic device to determine if one or more bus grant requests were received during a bus request period, identify a number of device characteristics associated with each bus grant request received during the bus request period, and output a bus grant to a device that output a bus grant request during the bus request period when each device characteristic of the bus grant request matches a corresponding stored characteristic of the bus request period.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 5:
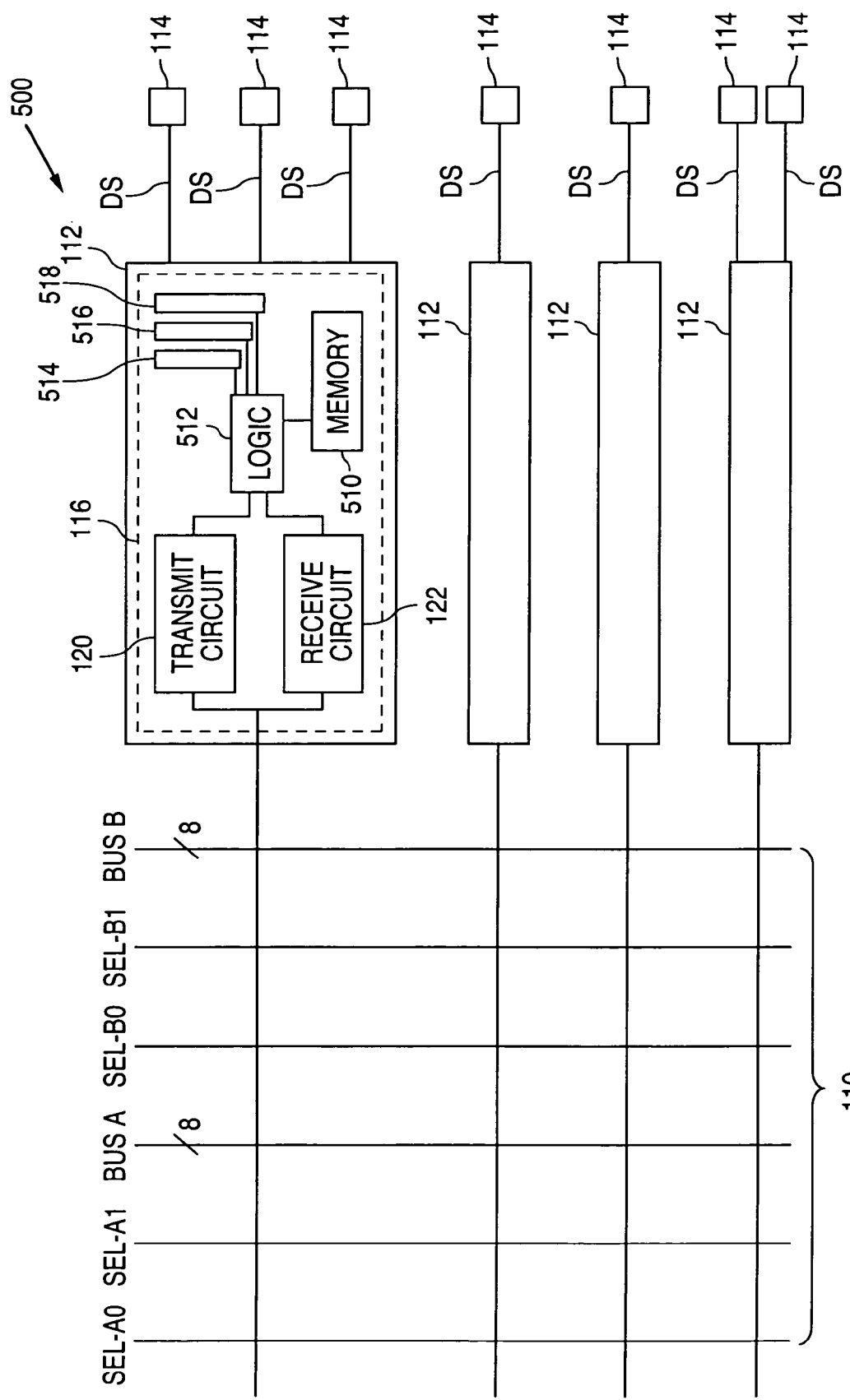
FIG. 5 is a block diagram illustrating an example of a bus-based communications system 500 in accordance with the present invention.

FIG. 5 shows a block diagram that illustrates an example of a bus-based communications system 500 in accordance with the present invention. System 500 is similar to system 100 and, therefore, utilizes the same reference numerals to designate the structures which are common to both systems.

As shown in FIG. 5, system 500 differs from system 100 in that system 500 includes a memory 510 that stores grant information that is associated with each of a number of arbitration periods. The grant information, which can be organized as a Priority Table, can be stored in a number of memory devices, including registers and non-volatile memory cells.

An example of a Priority Table is shown below. The Priory Table includes a number of rows of data where each row corresponds with an arbitration period. (As described above, an arbitration period can be a 26 clock cycle period where requests are received during a request period and a grant is output.) Thus, a Priority Table that is 512 rows long represents 512 consecutive arbitration periods.

| | Priority Table | | |
|---|---|---|---|
| Arbitration Period | Valid Status | Stored Priority | Stored Identity |
| 1 | X | XX | XXXXX |
| 2 | X | XX | XXXXX |
| 3 | X | XX | XXXXX |
| ... | ... | ... | ... |
| 512 | X | XX | XXXXX |

In addition, each row includes a valid status, a stored identity, and a stored priority. The valid status indicates whether the row of data associated with the arbitration period is valid. The stored identity identifies a communication circuit 116, while the stored priority indicates a priority level of a data cell to be transmitted by the communication circuit.

For example, each row of data can include five bits [bits 4:0] of stored identity that identify a communication circuit 116, two bits [bits 6:5] of stored priority that identify one of four priority levels, and one bit [bit 7] of valid status that indicates whether the data in the row associated with the arbitration period is valid.

The four priority levels include a high priority level represented by, for example, a 0-0, and a medium priority level represented by, for example, a 0-1. In addition, the four priority levels also include a low priority level represented by, for example, a 1-0, and an all priority level represented by, for example, a 1-1.

As further shown in FIG. 5, system 500 also differs from system 100 in that system 500 includes a logic circuit 512 and a high priority register 514 that indicates whether the high priority data received by a communication circuit 116 is arbitration, such as round robin, enabled. System 500 also includes a medium priority register 516 that indicates whether the medium priority data received by the communication circuit 116 is arbitration enabled, and a low priority register 518 that indicates whether the low priority data received by the communication circuit 116 is arbitration enabled.

Figure 1:
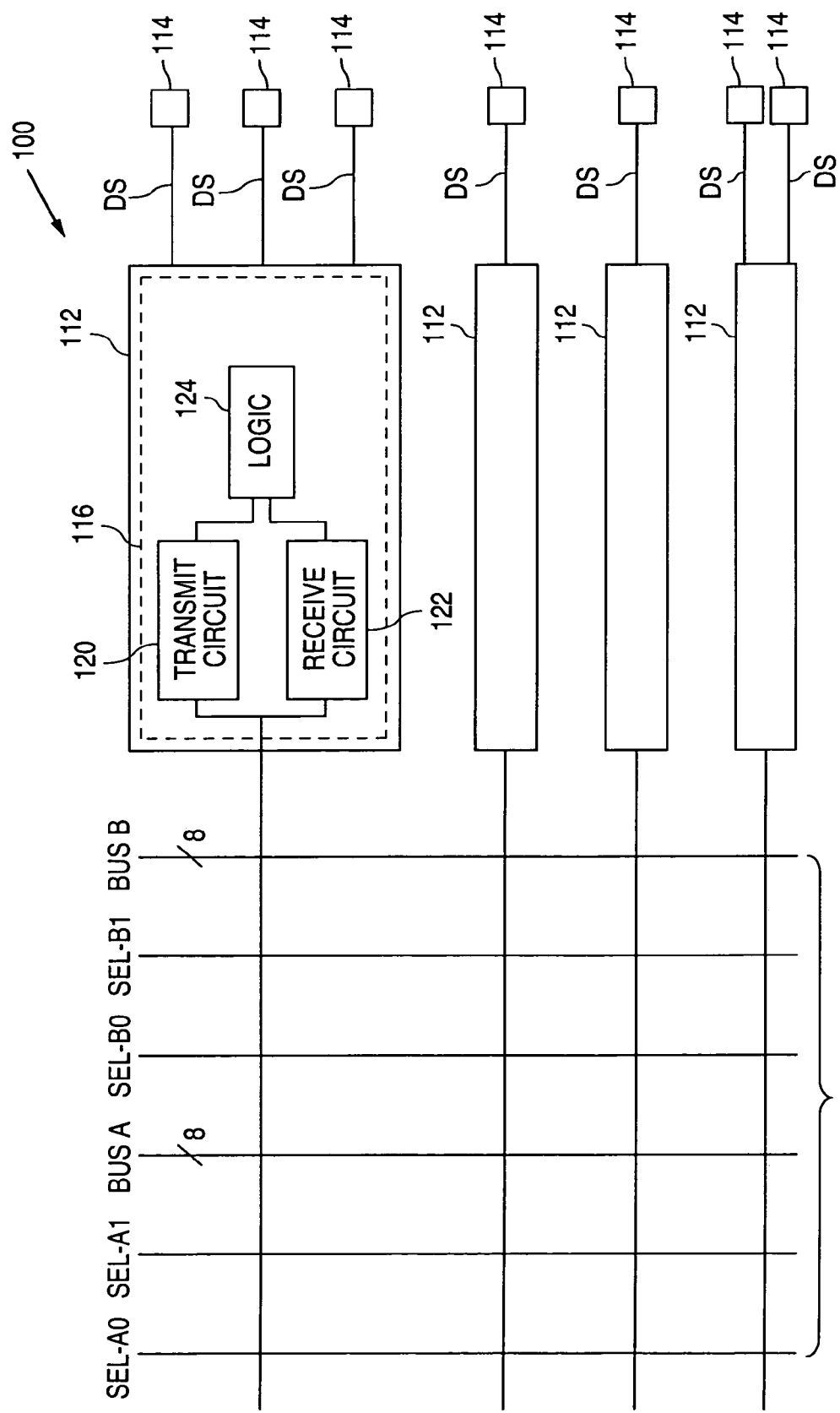
FIG. 1 is a block diagram illustrating a conventional bus-based communications system 100.
Figure 2:
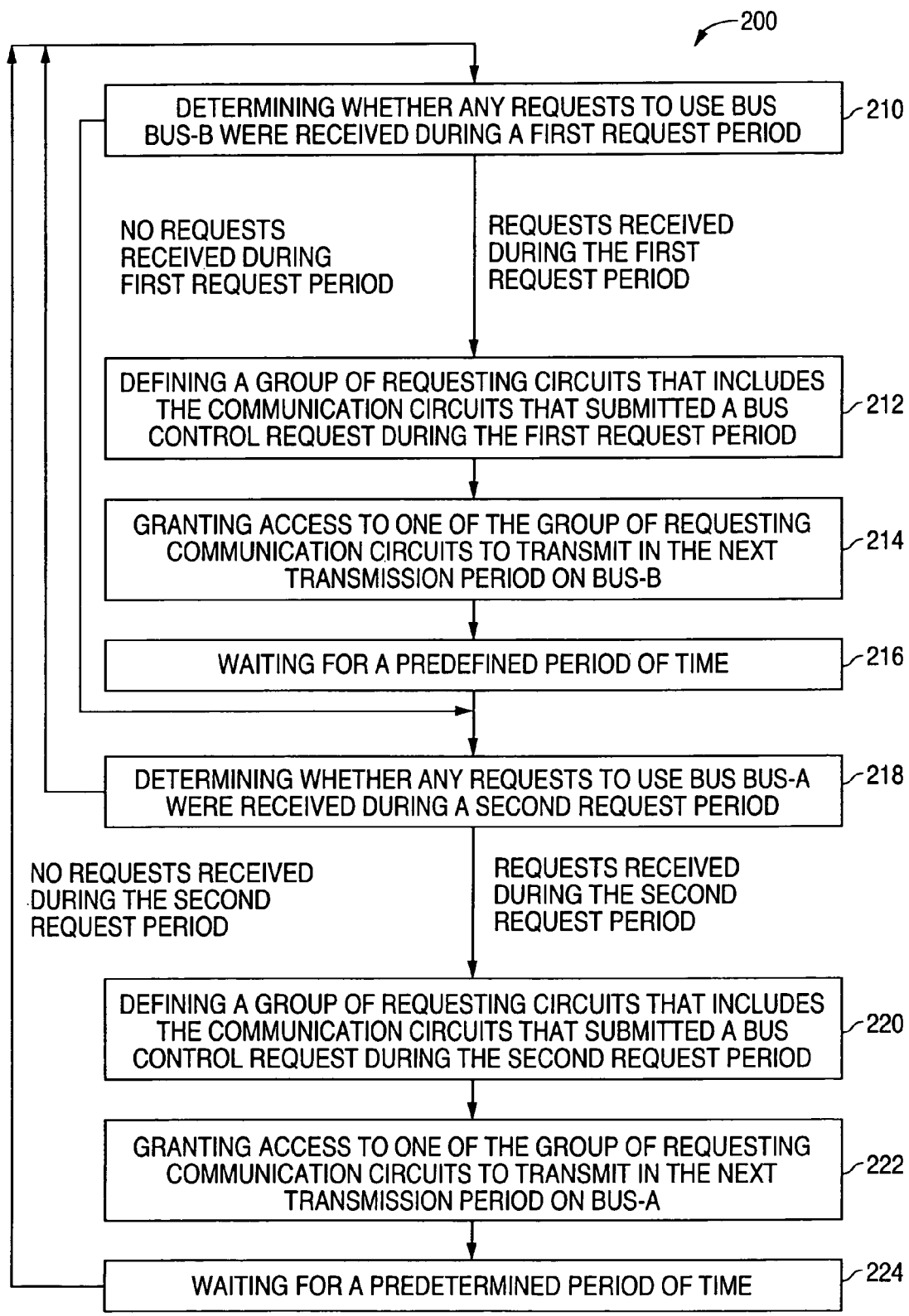
FIG. 2 is a state diagram illustrating a prior art state machine 200 operating as a bus master.
Figure 3:
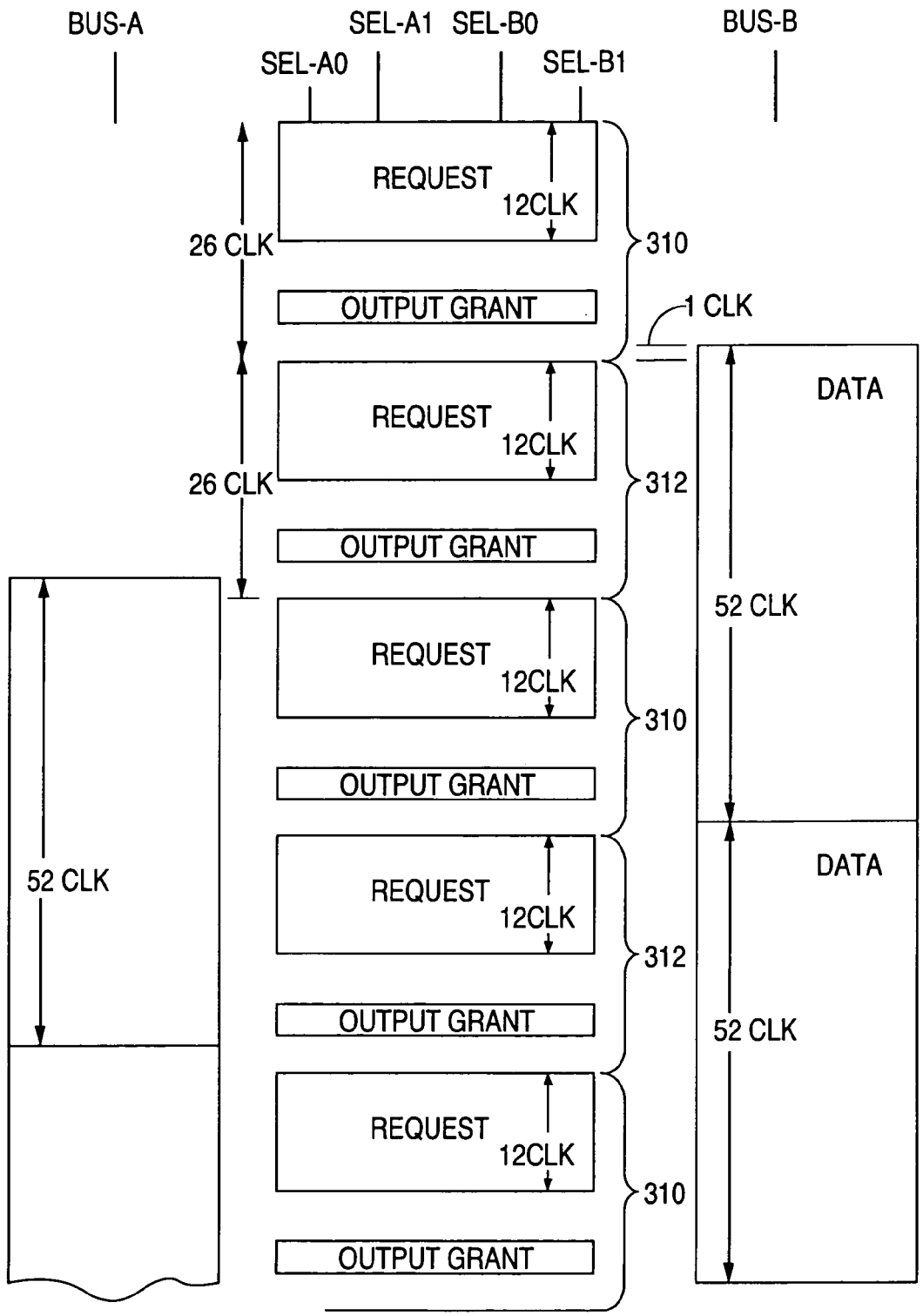
FIG. 3 is a graphical representation further illustrating prior art state machine 200.
Figure 4:
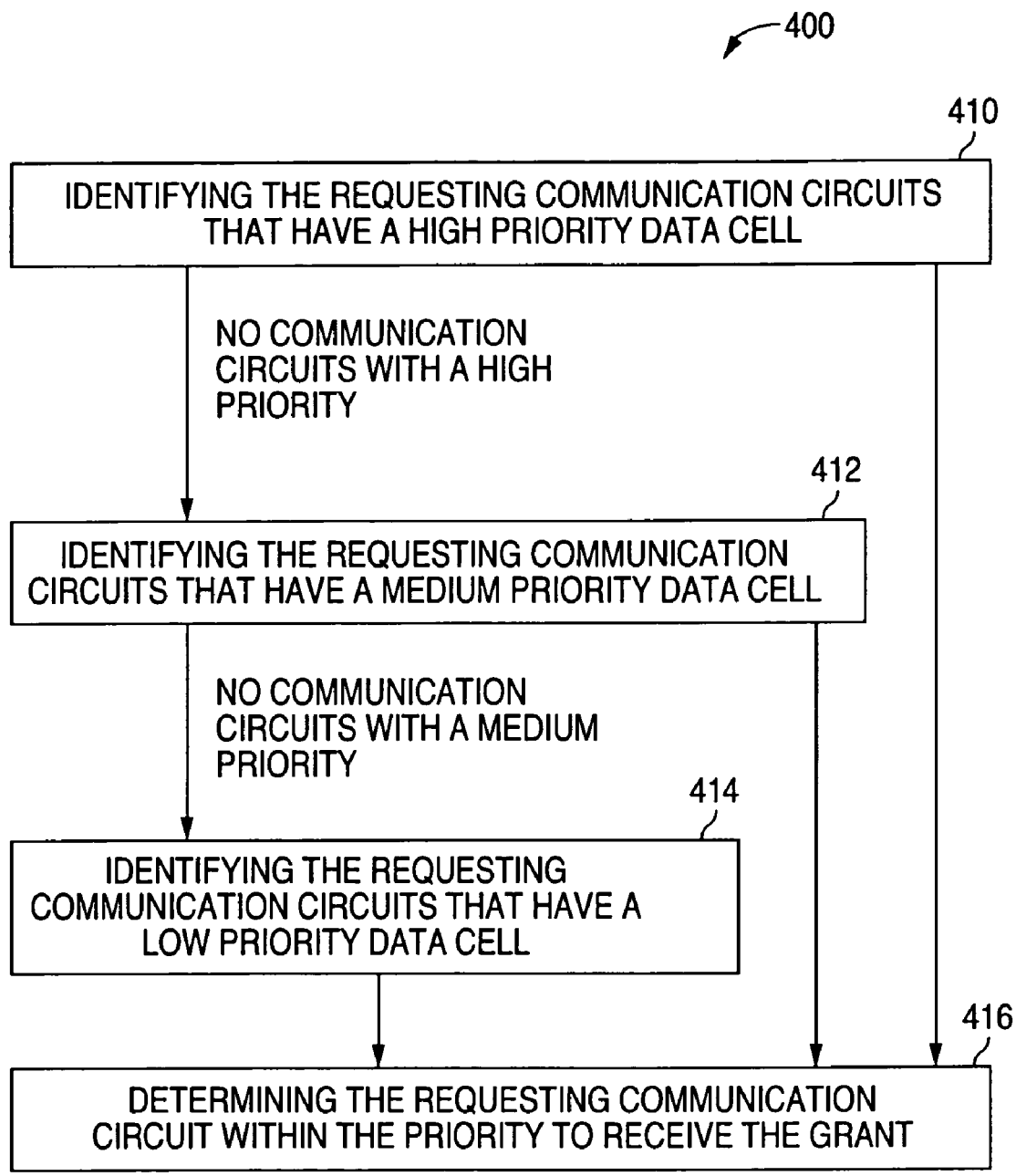
FIG. 4 is a flow chart illustrating a prior art method 400 of granting access to a bus to one of a number of requesting communication circuits.
Figure 6:
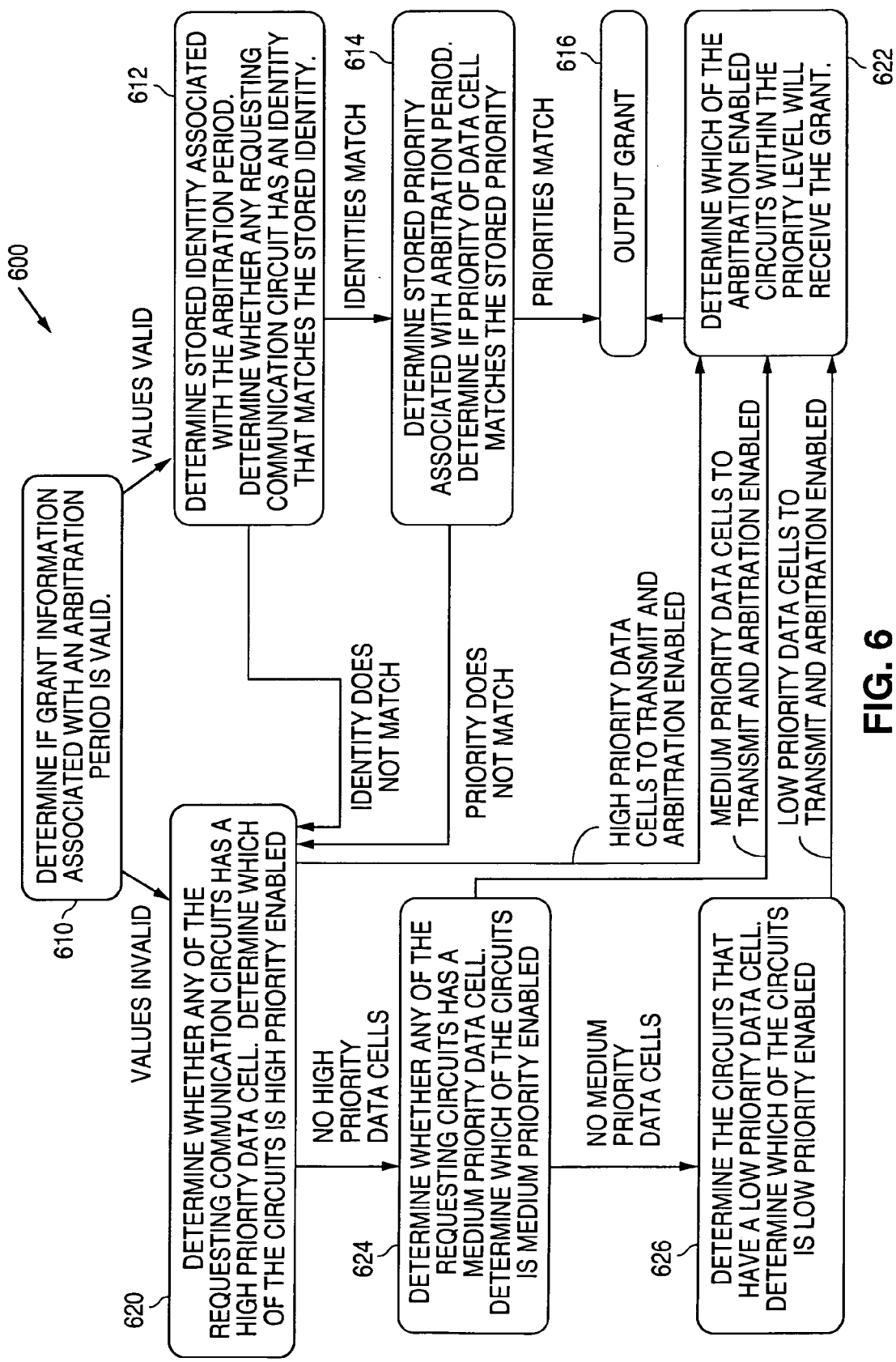
FIG. 6 is a state diagram illustrating an example of a state machine 600 that grants access to a bus to one of a number of requesting communication circuits in accordance with the present invention.

System 500 can operate the same as state machine 200 in determining a group of requesting circuits, as illustrated in states 210, 212, 218, and 220 shown in FIG. 2. FIG. 6 shows a state diagram that illustrates an example of a state machine 600 that grants access to a bus to one of a number of requesting communication circuits in accordance with the present invention. State machine 600 can be used to implement states 214 and 222 shown in FIG. 2.

In the present example, the logic circuit 512 of the bus master has determined the requesting communication circuits that submitted a bus control request to the bus master during the same request period of an arbitration period, such as in states 210, 212, 218, and 220. Method 600 can be executed by the memory 510 and logic circuit 512 of the communication circuit 116 that is the bus master in system 500.

A shown in FIG. 6, state machine 600 begins at state 610 by determining if the grant information that is associated with the arbitration period, such as the information stored in the row of the Priority Table that corresponds with the arbitration period, is valid, such as by checking the valid bit in the row of the Priority Table. The row of the Priority Table is selected to correspond with the arbitration period. For example, the first row of the table can correspond with the first arbitration period, and the 513$^{th}$ arbitration period when a 512 row Priority Table is used.

When the valid bit indicates that the information is valid, state machine 600 moves to state 612 to determine the stored identity that is associated with the arbitration period, such as by checking the identity bits in the row of the Priority Table that corresponds with the arbitration period. In addition, state machine 600 also determines in state 612 whether any requesting communication circuit has an identity that matches the stored identity.

When a requesting communication circuit has an identity that matches the stored identity, state machine 600 moves to state 614 to identify the requesting communication circuit as a matching communication circuit, and determine the stored priority that is associated with the arbitration period, such as by checking the priority bits in the row of the Priority Table that corresponds with the arbitration period. In addition, state machine 600 also determines in state 614 whether the priority of the data cell of the matching communication circuit matches the stored priority read from the row of the Priority Table.

When the priority of the data cell of the matching communication circuit matches the stored priority, state machine 600 moves to state 616 to output a grant to the matching communication circuit. The grant gives the matching communication circuit 116 permission to transmit during the next transmission period on a bus.

In state 610 when the grant information is invalid, in state 612 when a requesting communication circuit does not have an identity that matches the stored identity, and in state 614 when the matching communication circuit does not have a priority that matches the stored priority, state machine 600 moves to state 620 to determine whether any of the requesting communication circuits 116 wishes to transmit a high priority data cell. In addition, state machine 600 also determines in state 620 which of the high priority communications circuits are also arbitration enabled, such as by checking the high priority registers 514 on the communication circuits 116.

When an arbitration-enabled requesting communication circuit has a high priority data cell, state machine 600 moves to state 622 to determine which of the arbitration enabled communication circuits within the priority level will receive the grant (permission to transmit during the next transmission period).

When several requesting communication circuits 116 have the same priority level, the requesting communication circuit 116 to receive the grant can be defined by an arbitration, such as a declining round robin. As noted above, in a declining round robin, the requesting communication circuits 116 circulate within a hierarchical ranking.

After state machine 600 has selected a communication circuit from the arbitration, state machine 600 moves to state 616 to send a grant to the selected communication circuit. The grant gives the selected communication circuit 116 permission to transmit during the next transmission period on the bus.

If no communication circuits with a high priority data cell requested control, state machine 600 moves to state 624 to identify the requesting communication circuits 116 that wish to transmit a medium priority data cell. In addition, state machine 600 also determines in state 624 which of the medium priority communications circuits are also arbitration enabled, such as by checking the medium priority registers 516 on the communication circuits 116.

When an arbitration-enabled requesting communication circuit has a medium priority data cell, state machine 600 moves to state 622 to determine which of the communication circuits within the priority level will receive the grant (permission to transmit during the next transmission period). As above, the requesting communication circuit 116 to receive the grant can be defined by an arbitration, such as a declining round robin.

If no communication circuits with a medium priority data cell requested control, state machine 600 moves to state 626 to identify the requesting communication circuits that wish to transmit a low priority data cell. In addition, state machine 600 also determines in state 626 which of the low priority communications circuits are also arbitration enabled, such as by checking the low priority registers 518 on the communication circuits 116.

When an arbitration-enabled requesting communication circuit has a low priority data cell, state machine 600 moves to state 622 to determine which of the communication circuits within the priority level will receive the grant (permission to transmit during the next transmission period). As above, the requesting communication circuit 116 to receive the grant can be defined by an arbitration, such as a declining round robin. (State machine 600 can alternately be implemented in software.)

One of the advantages of the present invention is that the present invention insures that communication circuits with low priority data streams receive a minimum level of service. For example, to insure that a communication circuit 116 with a low priority data cell is able to transmit at least once every 512 arbitration cycles, where the Priority Table has 512 rows, the communication circuit 116 can be listed in one row with a low priority level type.

If a low priority data cell of the communication circuit 116 is to receive only one grant every 512 arbitration periods, then the low priority register 518 on the communication circuit 116 is set to prevent arbitration. If the low priority data cell of the communication circuit 116 is to receive at least one grant, but maybe more than one grant, every 512 arbitration periods, then the low priority register 516 is set to allow arbitration.

Another advantage is that the present invention can insure that communication circuits with a high priority data stream receive a known level of service. For example, to insure that a communication circuit 116 with a high priority data stream is able to transmit 150 times every 512 arbitration cycles, where the Priority Table has 512 rows, the communication circuit 116 can be listed in 150 rows with a high priority level type, and arbitration register 514 set to prevent arbitration.

Thus, not only does the present invention limit the bandwidth that a high priority user can have, thereby allowing low priority users to transmit on the bus, the present invention also guarantees the high priority user a predetermined bandwidth that is free from competition from other high priority users. Other levels of service can also be provided by varying the priority level and the enable status.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of assigning bus grants, the method comprising:
    determining if one or more bus grant requests were received during a bus request period, each bus grant request including a number of device characteristics, each bus request period having a corresponding number of stored characteristics; and
    outputting a bus grant to a device that output a bus grant request during the bus request period when each device characteristic of the bus grant request matches a corresponding stored characteristic.

2. The method of claim 1 wherein the number of device characteristics include a device identity.

3. The method of claim 2 wherein the number of device characteristics include a device priority.

4. The method of claim 1 and further comprising determining a bus grant recipient when each device characteristic of each bus grant request received during the bus request period fails to match a corresponding stored characteristic.

5. The method of claim 4 and further comprising assigning bus grant requests received during the bus request period to two or more groups based on a device characteristic.

6. The method of claim 5 wherein the device characteristic is a device priority.

7. The method of claim 5 wherein bus grant requests are assigned to a group only when enabled.

8. The method of claim 7 and further comprising:
determining if a first group of the two or more groups has any members;
outputting the bus grant to a device in the first group when the first group has a member;
determining if a second group of the two or more groups has any members when the first group has no members; and
outputting the bus grant to a device in the second group when the second group has a member.

9. The method of claim 5 and further comprising:
determining if a first group of the two or more groups has any members;
outputting the bus grant to a device in the first group when the first group has a member;
determining if a second group of the two or more groups has any members when the first group has no members; and
outputting the bus grant to a device in the second group when the second group has a member.

10. The method of claim 1 and further comprising:
determining if the corresponding number of stored characteristics associated with the bus request period is valid; and
outputting the bus grant to the device only when the corresponding number of stored characteristics associated with the bus request period is valid.

11. A communication device comprising:
a memory to hold a number of stored characteristics for each of a plurality of bus request periods; and
a logic device connected to the memory, the logic device to determine if one or more bus grant requests were received during a bus request period, identify a number of device characteristics associated with each bus grant request received during the bus request period, and output a bus grant to a device that output a bus grant request during the bus request period when each device characteristic of the bus grant request matches a corresponding stored characteristic of the bus request period.

12. The communication device of claim 11 wherein the number of device characteristics include a device identity.

13. The communication device of claim 12 wherein the number of device characteristics include a device priority.

14. The communication device of claim 11 wherein the logic device determines a bus grant recipient when each device characteristic of each bus grant request received during the bus request period fails to match a corresponding stored characteristic.

15. The communication device of claim 14 wherein the logic device assigns bus grant requests received during the bus request period to two or more groups based on a device characteristic.

16. The communication device of claim 15 wherein the device characteristic is a device priority.

17. The communication device of claim 16 wherein bus grant requests are assigned to a group only when enabled.

18. The communication device of claim 17 wherein the logic device:
determines if a first group of the two or more groups has any members;
outputs the bus grant to a device in the first group when the first group has a member;
determines if a second group of the two or more groups has any members when the first group has no members; and
outputs the bus grant to a device in the second group when the second group has a member.

19. The communication device of claim 16 wherein the logic device:
determines if a first group of the two or more groups has any members;
outputs the bus grant to a device in the first group when the first group has a member;
determines if a second group of the two or more groups has any members when the first group has no members; and
outputs the bus grant to a device in the second group when the second group has a member.

20. The communication device of claim 11 wherein the logic device:
determines if the corresponding number of stored characteristics associated with the bus request period is valid; and
outputs the bus grant to the device only when the corresponding number of stored characteristics associated with the bus request period is valid.

* * * * *